United States Patent [19]

Kyoto et al.

[11] Patent Number: 4,812,155
[45] Date of Patent: Mar. 14, 1989

[54] METHOD FOR PRODUCTION OF GLASS PREFORM FOR OPTICAL FIBERS

[75] Inventors: Michihisa Kyoto; Naoki Yoshioka; Gotaro Tanaka; Hiroo Kanamori; Minoru Watanabe, all of Yokohama; Motohiro Nakahara, Mito, all of Japan

[73] Assignees: Nippon Telegraph & Telephone Public Corporation, Tokyo; Sumitomo Electric Industries, Ltd., Osaka, both of Japan

[21] Appl. No.: 132,655

[22] Filed: Dec. 10, 1987

Related U.S. Application Data

[63] Continuation of Ser. No. 901,979, Sep. 2, 1986, abandoned, which is a continuation of Ser. No. 661,452, Oct. 16, 1984, abandoned.

[30] Foreign Application Priority Data

Oct. 19, 1983 [JP] Japan .................. 58-194102
Oct. 19, 1983 [JP] Japan .................. 58-194103

[51] Int. Cl.$^4$ .................. C03P 37/014; C03B 37/018
[52] U.S. Cl. .................. 65/3.12; 65/3.11; 65/DIG. 16
[58] Field of Search .............. 65/3.12, DIG. 16, 18.2, 65/17, 2, 13, 3.11

[56] References Cited

U.S. PATENT DOCUMENTS

| 3,933,454 | 1/1976 | Deluca | 65/3.12 |
| 4,317,668 | 3/1982 | Susa | 65/29 |
| 4,426,216 | 1/1984 | Satoh | 65/17 X |
| 4,629,485 | 12/1986 | Berkey | 65/3.11 |

FOREIGN PATENT DOCUMENTS

| 3206176 | 8/1983 | Fed. Rep. of Germany | 65/DIG. 16 |
| 2428618 | 2/1980 | France | 65/DIG. 16 |
| 5567533 | 5/1980 | Japan | 65/DIG. 16 |
| 5650136 | 5/1981 | Japan | 65/DIG. 16 |
| 5992936 | 5/1984 | Japan | 65/DIG. 16 |

Primary Examiner—Kenneth M. Schor
Attorney, Agent, or Firm—Cushman, Darby & Cushman

[57] ABSTRACT

A method for producing a glass preform for optical fibers in which fluorine is efficiently incorporated into the preform without incorporation of Fe or Cu. A fine glass particle mass, made primarily of quartz, is converted into transparent glass by heating it in a gas atmosphere containing at least a fluorine-based compound gas and a chlorine-based compound gas. The preferred heating range is 1,100° to 1,400° C.

6 Claims, 4 Drawing Sheets

METHOD FOR PRODUCTION OF GLASS PREFORM FOR OPTICAL FIBERS

This is a continuation of application Ser. No. 901,979, filed Sept. 2, 1986, which was abandoned upon the filing hereof and which is a continuation of Ser. No. 661,452, filed Oct. 16, 1984 now abandoned.

BACKGROUND OF THE INVENTION

The present invention relates to a method for producing a glass preform for use in the fabrication of optical fibers. More particularly, the invention is concerned with a method for producing a quartz glass preform with fluorine incorporated therein.

A glass preform for fabrication of optical fibers is composed of a core and a cladding surrounding the core. The core must have a higher refractive index than the cladding so as to allow easy propagatin of light therethrough.

In order to increase the refractive index of the core, additives such as $TiO_2$, $GeO_2$ and $Al_2O_3$ are usually added (for a base material of silica). In general with optical fibers, pure quartz glass is often used to form the cladding. In this case, pure quartz glass is produced so that $n = 1.4585$ and $\Delta n = 0$.

Referring to Figs. 1A and 1B, there are shown diagrams illustrating the distribution of the refractive index for optical fibers. A and B in these figures indicate, respectively, the core and cladding. The difference in refractive index between the core and cladding is usually indicated in terms of a relative refractive index difference (in percent). That is, assuming that the refractive indices of the core and cladding are $n_1$ and $n_2$, respectively, the relative refractive index difference $\Delta n_{12}\%$ is represented by the following equation:

$$\Delta n_{12}\% = \frac{n_1 - n_2}{n_2} \times 100.$$

FIG. 1A shows the general distribution of refractive index for single mode optical fibers. In this case, $\Delta n_{12}$ is usually 0.3 to 0.5%. FIG. 1B shows the general distribution of refractive index for multi-mode optical fibers. For optical fibers for ordinary communication purposes, $\Delta n_{12}$ is usually about 1%, and for large aperture optical fibers used in computer ring communication applications, $\Delta n_{12}$ is usually about 2 to 4%.

Oxide additives such as $GeO_2$ added to increase refractive index cause light scattering (Rayleigh scattering) because of their intrinsic characteristics. As the amount of the additive added is increased, the degree of light scattering (Rayleigh scattering) due to the additive increases. This is not desirable for light transmission.

If the additive is added in large amounts, formation of bubbles and a crystal phase in the base material results. In the case of $GeO_2$, for example, the formation of GeO gas easily occurs, thereby producing bubbles. In the case of $Al_2O_3$, clusters of $Al_2O_3$ crystals are easily formed. This is not desirable for light transmission characteristics and also for the strength of the final optical fibers. Furthermore, the coefficient of thermal expansion of glass increases, which makes the glass preform fragile. Therefore, also from the viewpoint of light propagation and glass strength, it is preferred that the amount of the additive added to the glass preform to be reduced.

For this reason, there is generally employed a procedure in which the refractive index difference is increased by lowering the refractive index of the cladding. For example, additives which lower the refractive index, such as $B_2O_3$, fluorine or a combination thereof, can be added to the cladding. $B_2O_3$, however, has disadvantages in that the coefficient of thermal expansion of the resulting cladding greatly changes with the concentration of $B_2O_3$ and that the refractive index changes upon heating. Furthermore, with regard to light propagation characteristics, the cladding has an absorption loss due to $B_2O_3$ in the longer wavelength region. Thus, it is preferred to use fluorine as a refractive index-lowering agent.

It is known that the addition of fluorine to quartz glass enables the production of optical fibers of various refractive index distributions, and that, by the proper choice of structure, there can be obtained optical fibers of low dispersion over a wide wavelength region.

The advantage that can be obtained by using fluorine as an additive is that, since the refractive index of the cladding can be made lower than that of pure quartz, pure quartz or quartz glass with a small amount of additive added thereto can be used in the fabrication of the core.

FIGS. 2A through 2D show typical refractive index distribution structures of which those of FIGS. 2A and 2C are of the step index type and those of FIGS. 2B and 2D are of the graded index type. In all of FIGS. 2A to 2D, fluorine is added to the cladding. With regards to the core, in the case of FIG. 2A, small amounts of oxides which increase the refractive index, such as $GeO_2$ and $P_2O_5$, are added to quartz glass, whereas in the case of FIG. 2C, high purity quartz glass containing no additives is used. In FIG. 2B, the amount of fluorine added is decreased continuously from the periphery of the core to the center, and the central portion is made of pure quartz glass not containing fluorine (the refractive index of pure quartz glass is $n = 1.4585$, $\Delta n = 0$). In FIG. 2D, the amount of fluorine added is decreased continuously from the periphery of the core to the center, and at a certain distance from the periphery, starts the addition of an additive used to increase the refractive index of quartz glass, with the amount of the additive added increasing continuously towards the center.

As a matter of course, to control the refractive index and facilitate the working of the glass, additives such as $GeO_2$, $P_2O_5$, $B_2O_3$ and $Al_2O_3$ can be used in combination with fluorine in the cladding and core.

In order to obtain the same refractive index difference as shown in FIG. 1 for optical fibers of quartz glass with fluoride added thereto, it is sufficient to decrease the amount of oxides added to the core, or alternatively, not to add the oxides at all. This leads to a reduction in the degree of Rayleigh scattering due to the presence of the additive. Thus, the rresulting optical fiber is preferred as a waveguide. Fluorine is available in abundance as compared with additives such as $GeO_2$, and furthermore is advantageous from an economical standpoint in that its purification is easy. Another feature is that a fluorine-based compound fas is superior not only as a starting material for the additive, but also as a dehydrating agent for removing water contained in the soot.

Various techniques are known for fabrication of quartz glass optical fibers, including the inside chemical vapor deposition (CVD) method (Japanese patent publication Nos. 23186/76 and 22423/80), the outside chemical vapor deposition (CVD) method (Japanese patent Kokai publication (unexamined) No. 10055/74), the vapor axial deposition (VAD) methods (Japanese patent Kokai publication (unexamined) No. 71316/76), and the plasma chemical vapor deposition (CVD) method (Japanese patent Kokai publication (unexamined) No. 54446/76). Of these methods, the outside CVD method utilizing a flame hydrolysis reaction and the VAD method are superior in productivity and are economical procedures. On the other hand, although fluorine can be added to quartz glass by a procedure utilizing a flame hydrolysis reaction, it is quite difficult to uniformly add a sufficient amount of fluorine to the quartz glass by this procedure.

Japanese patent Kokai publication (unexamined) No. 15682/80, for example, discloses a method of incorporating fluorine into a glass preform. In accordance with this method, however, a variation in the refractive index due to the addition of fluorine as determined relative to that $\Delta n_{12}$ of quartz glass is at most about $-0.2\%$. That is, the method has a disadvantage in that the amount of fluorine that can be added is limited.

Fluorine is incorporated into fine particles of quartz according to the following equation:

$$SiF_4(g) + 3SiO_2(s) \rightarrow 4SiO_{1.5}F(s), \qquad (1)$$

where (g) and (s) indicate gas and a solid. Since, however, water resulting from combustion is present in the oxyhydrogen flame used in the production of soots, $SiF_4$ (g) reacts with water as represented by the following equation:

$$SiF_4(g) + 2H_2O(g) \rightarrow SiO_2(s) + 4HF(g) \qquad (2)$$

That is, $SiF_4$ is consumed upon reaction with a large amount of water present in the flame as well as acting as an additive for quartz glass. It is apparent, therefore, that the efficiency of addition of $SiF_4$ drops.

Japanese patent publication No. 15682/80 discloses a method in which fluorine is incorporated into glass by applying a fluorine-based compound gas at the step of synthesizing glass in gas phase. This method does permit the incorporation of fluorine into glass, but has a disadvantage in that the efficiency of deposition of glass and the yield of incorporation of fluorine (doping yield) are low. The reason for this is considered that, in the flame hydrolysis method using a $H_2/O_2$ flame, water in the flame reacts with a fluorine-based compound gas (e.g., $SF_6$) according to equation (3) below, thereby producing HF gas:

$$SF_6 + 3H_2O \rightarrow SO_3 + 6HF. \qquad (3)$$

HF gas is stable, and almost all of the fluorine-based compound gas is converted into HF gas at elevated temperatures as long as there is water present. Thus, a minor proportion of fluorine-based compound gas is utilized as the dopant starting material.

Hydrogen fluoride (HF) formed in the reaction specified by equations (2) and (3) acts to corrode glass, particularly quartz ($SiO_2$), and easily reacts with fine quartz particles formed in the flame, as shown by the following equations (4) and (5):

$$SiO_2(s) + 2HF(g) \rightarrow SiOF_2(g) + H_2O(g) \qquad (4)$$

$$SiO_2(s) + 4HF(g) \rightarrow SiF_4(g) + 2H_2O(g) \qquad (5)$$

This inhibits the grain growth of glass particles and decreases the amount of fine glass particles being deposited. This is apparent from the fact that, as the amount of a fluorine compound added is increased, the rate of deposition of fine glass particles drops, and finally they do not deposit at all.

Japanese patent Kokai publication (unexamined) No. 7533/80 discloses a method which is intended to overcome the above-described problems of the method of Japanese Patent Publication No. 15682/80. Specifically, it discloses: (1) a method for producing a glass material for optical glass particles formed by the flame hydrolysis method in an atmosphere of a fluorine compound gas at 1,000° C. or less, and thereafter sintering the laminated body by heating it to more than 1,400° C. in an inert gas atmosphere; and (2) a method for producing a glass material for optical transmission which comprises heating the glass particle laminated body of (1) in a fluorine compound/inert gas atmosphere to more than 1,400° C. to form a glass material containing fluorine. Methods (1) and (2) enable fluorine to be incorporated more effectively than the method of Japanese patent publication No. 15682/80. It has been discovered, however, that methods (1) and (2) still have disadvantages as described below.

In method (1), the rate of incorporation of fluorine into glass is slow and, in some cases, the ultimate optical fibers contain impurities such as Cu and Fe, and an increase in transmission loss due to such impurities reaches about 3 to 5 dB/km at a wavelength of 1.30 micrometer (the usual loss at this wavelength band is 0.3 dB/km). The amount of fluorine incorporated into glass by method (1) is $-0.20\%$ in terms of the refractive index difference $\Delta n_{12}(F)$.

It has been discovered that, in some cases, the final optical fibers contain Cu and Fe. It is known that Cu and Fe cause an absorption loss, which is responsible for an increase in the transmission loss.

Method (2) is an efficient procedure in that, as compared with method (1), the rate of incorporation of fluorine is high and the amount of fluorine added is large. After a processing time of 6 hours, $\Delta n_{12}$ (F) reaches $-0.25\%$. However, the obtained glass preform is seriously corroded and has an irregular surface. The core tube used in the production of the glass preform, which is a quartz muffle tube used to hold therein a gas atmosphere, is seriously corroded and, in some cases, perforations are formed in the walls of the tube. This etching is considered to partly accelerate the incorporation of impurities from the muffle tube into the soot preform. The loss of the thus-produced optical fiber is about 10 dB/km at a wavelength of 1.30 micrometer. Since the OH group content of the optical fiber is 0.05 ppm or less, it cannot be considered that the increase in absorption loss at 1.30 micrometer is due to the presence of the OH group. There are many experiments supporting the conclusion that the increase in absorption loss due to impurities such as Cu and Fe existing in the optical fiber amounts to 9.5 dB/km.

In addition, the optical fiber produced by the above-described method has disadvantages in that the absorption loss due to the OH group changes with time, and as the temperature rises, the absorption loss considerably increases.

One of the reasons why impurities such as Fe and Cu are present in the optical fiber is that corrosion of the core tube allows $Fe_2O_3$ and CuO present in the core tube walls to migrate to the surface of the tube and to intermingle with the soot, undergoing reactions represented by the following equations:

$$Fe_2O_3 + 2F_2 \rightarrow 2FeF_2 + 3/2O_2 \quad (6)$$

$$CuO + \tfrac{1}{2}F_2 \rightarrow CuF + \tfrac{1}{2}O_2 \quad (7)$$

Although $FeF_2$ and $CuF$ are solid up to 1,100° C., they sublimate at temperatures in excess of 1,100° C., thereby intermingling with the soot. Thus the soot preform is contaminated with $FeF_2$ and $CuF$.

When $Fe_2O_3$ and $CuO$ are contained in the soot preform, even if they undergo the reactions of equations (6) and (7), the resulting products $FeF_2$ and $CuF$ are not removed from the soot and remain therein as impurities since they are solid at temperatures below 1,100° C. Thus, in accordance with either of methods (1) and (2), impurities are left in the optical fibers.

SUMMARY OF THE INVENTION

The present invention is intended to overcome the above-described problems of the prior art, and an object of the present invention is to provide a method for efficiently incorporating fluorine into a glass preform for fabrication of optical fibers.

Another object of the present invention is to provide a method for producing a light transmission glass fiber in which the rate of incorporation of fluorine into fine glass particles is increased, the incorporation of impurities such as Fe and Cu into glass during the process of adding fluorine is prevented, and the fiber has stable transmission characteristics.

An important feature of the present invention is that, in the production of a glass preform for optical fibers, a fine glass particle mass (soot preform) composed mainly of quartz ($SiO_2$) produced by a flame hydrolysis reaction or a solution hydrolysis method such as a sol-gel method is converted into transparent glass by heating in an inert gas atmosphere containing at least fluorine-based compound gas and chlorine-based compound gas.

In a preferred embodiment of the present invention, the above-described heating treatment is applied at a temperature range of 1,100° to 1,400° C.

The method of the present invention permits the control of $\Delta n_{12}(F)$ to $-1\%$ and the production of optical fibers of low transmission loss without the damage to the oven material encountered in the prior art methods.

As a result of extensive investigation, it has been found that advantages as described below can be obtained when a soot preform is heated in an inert gas atmosphere containing at least fluorine-based compound gas and chlo- rine-based compound gas. For example, when a soot preform is heated in an inert gas atmosphere containing $Cl_2$ gas and $SF_6$ gas, the following can be obtained:

(1) Corrosion of the muffle tube is greatly suppressed. Under certain conditions, the muffle tube can be used for a period longer than one month.

(2) Examination of the loss characteristics of the produced optical fiber indicates that there is no absorption due to the presence of impurities such as Cu and Fe.

(3) A maximum refractive index difference $\Delta n_{12}(F)$ as obtained by addition of fluorine reaches $-0.80\%$.

On the other hand, when a soot preform is heated in an inert gas atmosphere consisting of $SF_6$ gas alone ($Cl_2$ gas is not used), the following results are obtained:

(1) The muffle tube is seriously corroded. Under certain conditions, the muffle tube is damaged in only in a single day.

(2) For the produced optical fiber, there is considerable absorption due to the presence of impurities such as Cu and Fe.

(3) The refractive index difference $\Delta n_{12}(F)$ as obtained by addition of fluorine is at most 0.20%.

The following are believed to produce the above-described effects obtained by addition of chlorine gas:

(1) Water present in the gas atmosphere, coming from the outside or from the muffle tube itself or soot preform, undergoes a reaction as represented by equation (8) as described below and is converted into hydrochloric acid. Thus the water is prevented from reacting with $SF_6$ according to equation (9) below while forming hydrogen fluoride (HF). For this reason, the corrosion of the muffle tube by hydrogen fluoride can be suppressed.

$$H_2O(g) + Cl_2(g) \rightarrow 2HCl(g) + \tfrac{1}{2}O_2(g) \quad (8)$$

$$H_2O(g) + \tfrac{1}{3}SF_6(g) \rightarrow 2HF(g) + \tfrac{1}{3}SO_3(g) \quad (9)$$

It is known that hydrochloric acid does not etch the muffle tube (quartz). Since the reaction of the equation (9) is suppressed, a reaction for the incorporation of fluorine into quartz glass as represented by equation (10) below proceeds efficiently.

$$4SiO_2(s) + SF_6(g) \rightarrow 4SiO_{1.5}F(s) + SO_2(g) + F_2(g) \quad (10)$$

(2) When the formation of hydrogen fluoride is prevented as described in (1) above, increases in the amount of impurities such as Fe and Cu due to corrosion of the muffle tube are suppressed. Furthermore, even if Fe and Cu are present, they undergo the reaction of equations (11) and (12) below and the resulting products CuCl (g) and $FeCl_3$ (g) are removed from the system because of their high volatility.

$$Fe_2O_3(s) + 3Cl_2(g) \rightarrow 2FeCl_3(g) + 3/2O_2(g) \quad (11)$$

$$CuO(s) + \tfrac{1}{2}Cl_2(g) \rightarrow CuCl(g) + \tfrac{1}{2}O_2(g) \quad (12)$$

Since $FeF_2$ and $CuF$ sublimate at temperatures in excess of 1,100° C., it is preferred that the soot preform be heated at temperatures of 1,100° C. or more, even in a gas atmosphere containing $Cl_2$ gas.

The fluorine-based compound gas as used herein is not limited to $SF_6$; any compound capable of decomposing at high temperatures and doping glass with fluorine, such as $CF_4$, $F_2$, $SiF_4$, $COF_2$ and $CCl_2F_2$ can be used. As the chlo- rine-based compound gas, any compound having a dehydration action, such as $SOCl_2$, $COCl_2$ and $CCl_4$ can be used. If a compound gas containing atoms such as carbon causing a scattering loss in a glass preform is used, it is preferred that oxygen has be added.

DESCRIPTION OF THE PREFERRED EMBODIMENTS

Production of Soot Preform

Figures 1A, 1B:
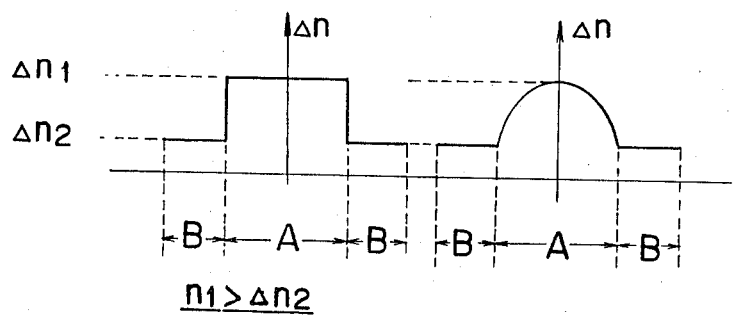
FIG. 1A shows the general refractive index distribution of single mode optical fibers.
FIG. 1B shows the general refractive index distribution of multi-mode optical fibers.
Figures 2A, 2B, 2C, 2D:
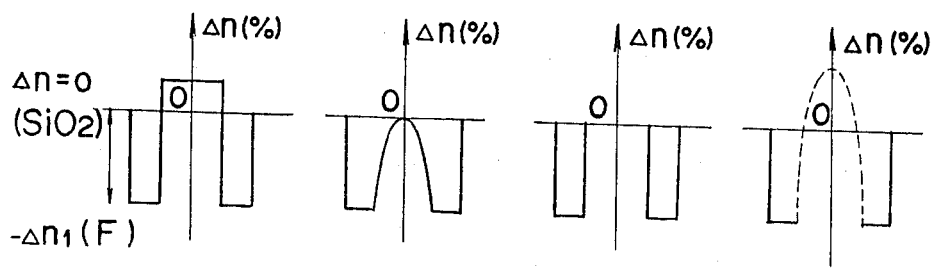
FIGS. 2A to 2D show the refractive index distribution of low-dispersion type optical fibers in which the cladding is doped with fluorine.
Figures 3A, 3B:
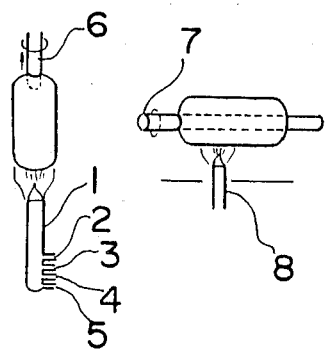
FIGS. 3A and 3B are views illustrating a method for production of a soot preform by the flame hydrolysis method.

In producing a quartz glass fine particle mass by the flame hydrolysis reaction, as indicated in FIG. 3A, oxygen 2, hydrogen 3, and a starting material gas, $SiCl_4$ or a mixed gas of $SiCl_4$, $GeCl_4$, $AlCl_3$, $SF_6$, and the like, are introduced into an oxyhydrogen flame by means of a coaxial multi-tube burner 1, made of quartz with Ar gas or He gas as a carrier gas, where they react. In FIG. 3A reference numeral 4 indicates Ar gas which is introduced as a barrier gas so that the starting material gas reacts in a space several millimeters apart from the top of the burner 1. If it is intended to produce a fine glass particle rod, the fine glass particle mass is deposited in the axial direction from the top of rotating starting member 6. If it is intended to produce a pipe-like fine glass particle mass, as shown in FIG. 3B, a fine glass particle mass is deposited around a rotating quartz bar or carbon bar 7 while traversing a burner 8 and, thereafter, the central core is removed. The bar 7 may be a glass preform for the core. In this case, the central member need not be removed. A plurality of burners 8 may be used.

The same soot preform as produced by the method of FIGS. 3A and 3B can be obtained by a hydrolysis process of alcoholate. This method is called the sol-gel method.

Figures 4A, 4B, 4C:
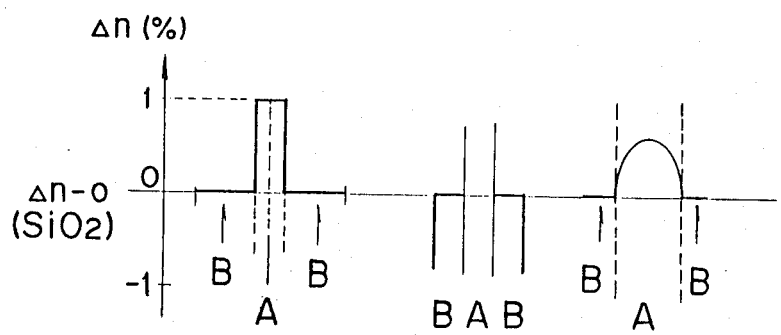
FIGS. 4A to 4C are views showing a structure when soot is deposited on the starting member in Examples 6-1 to 6-3, respectively.

The thus-produced soot preform has a refractive index distribution as shown in FIGS. 4A to 4C, for example.

The refractive index is increased by the addition of dopants such as $GeO_2$ and $TiO_2$.

Sintering of Soot Preform

The above-produced soot preform is placed in a muffle tube made of pure quartz. It is heated to 1,400° C. at a temperature-increasing rate of 2° to 10° C./min in an inert gas atmosphere containing $SF_6$ and $Cl_2$, and thereafter converted into transparent glass in an atmosphere of an inert gas such as He at such a temperature that the surface of the soot is 1,400° C. or higher. The thus-obtained glass preform is a glass material doped with fluorine, and its representative refractive index distribution is shown in FIG. 5.

The present invention is described in greater detail with reference to the following Examples.

EXAMPLE 1

A quartz soot preform for fabrication of a single mode fiber as produced by the method of FIGS. 3A and 3B was placed in a quartz muffle tube, and a heat treatment (heating in a uniformly heating furnace) was applied to the preform to convert it into transparent glass. A combination of He and fluorine-based compound and chlorine-based compound gases as shown in Table 1 was introduced into the furnace. The temperature in the furnace was raised at a rate of from 3° to 4° C./min from 1,100° C. to 1,400° C., and thereafter the preform was heated in an atmosphere consisting of He alone under the conditions that the temperature of the soot surface was 1,400° C. or more. Conditions under which the heat treatment was applied and the results are shown in Table 1.

As Comparative Examples 1 and 2, the same procedure as above was repeated, with the exception that the chlorine-based compound gas was not used. The results are also shown in Table 1.

TABLE 1

| Run No. | Fluorine-Based Compound Gas | | Chlorine-Based Compound Gas | | Transmission Loss (at 1.30 μm) dB/km | Refractive Index Difference (%) | |
|---|---|---|---|---|---|---|---|
| | Compound | Flow Rate (ml/min) | Compound | Flow Rate (ml/min) | | Δn (Me) | Δn (F) |
| Example 1-1 | $SF_6$ | 50 | $Cl_2$ | 50 | 0.5 | 0.3 | −0.15 |
| Example 1-2 | $SF_6$ | 200 | $Cl_2$ | 50 | 0.5 | 0.25 | −0.30 |
| Example 1-3 | $SF_6$ | 500 | $Cl_2$ | 50 | 0.5 | 0.15 | −0.55 |
| Comparative Example 1 | $SF_6$ | 500 | — | — | 5 | 0.20 | −0.55* |
| Comparative Example 2 | $CF_4$ | 500 | — | — | 10 | 0.25 | −0.40* |

*Note: Fe and Cu are present.

Figure 6:
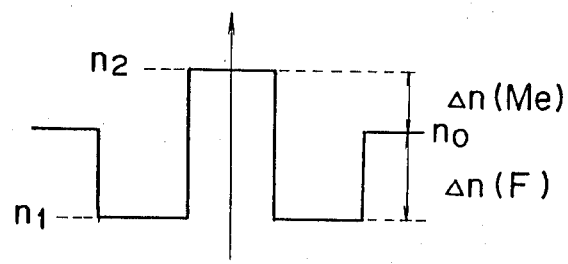
FIG. 6 shows the distribution of refractive indices of the optical fibers as produced in Example 1 and Comparative Examples 1 and 2.

$\Delta n$ (Me) and $\Delta n$ (F) indicate refractive index differences of an optical fiber as defined in FIG. 6.

$$\Delta n \text{ (Me)} = \frac{n_2 - n_0}{n_0} \times 100$$

$$\Delta n \text{ (F)} = \frac{n_1 - n_0}{n_0} \times 100,$$

wherein $n_0 = 1.4585$, which is the refractive index of quartz glass.

EXAMPLE 2

A quartz glass soot preform for fabrication of graded optical fiber as produced by the method of FIGS. 3A and 3B was placed in a quartz muffle tube and then was subjected to a heat treatment in an atmosphere as shown in Table 2. The temperature of the heat treatment was the same as in Example 1. The results are shown in Table 2.

TABLE 2

| Run No. | Fluorine-Based Compound Gas | | Chlorine-Based Compound Gas | | Transmission Loss (at 1.30 μm) dB/km | Refractive Index Difference (%) | |
|---|---|---|---|---|---|---|---|
| | Compound | Flow Rate (ml/min) | Compound | Flow Rate (ml/min) | | Δn (Me) | Δn (F) |
| Example 2-1 | $SF_6$ | 50 | $Cl_2$ | 50 | 0.4 | 0.9 | −0.30 |
| Example 2-2 | $SF_6$ | 500 | $Cl_2$ | 50 | 0.4 | 0.9 | −0.50 |
| Example 2-3 | $SiF_4$ | 500 | $Cl_2$ | 50 | 0.4 | 0.9 | −0.50 |

Figure 7:
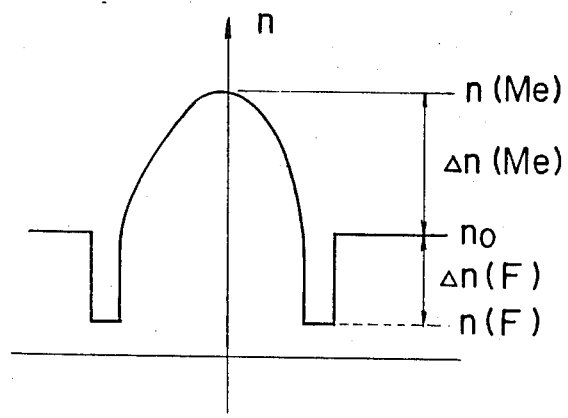
FIG. 7 shows the distribution of refractive indices of the optical fibers as produced in Examples 2 and 3.

Δn (Me) and Δn (F) indicate refractive index differences as defined in FIG. 7.

$$\Delta n \text{ (Me)} = \frac{n \text{ (Me)} - n_0}{n_0} \times 100$$

$$\Delta n \text{ (F)} = \frac{n \text{ (F)} - n_0}{n_0} \times 100.$$

EXAMPLE 3

A quartz soot preform for fabrication of a single mode optical fiber as produced by the method of FIGS. 3A and 3B was subjected to a heat treatment (zone heating) by passing it through a furnace maintained at 1,400° C. at a velocity of from 2 to 4 mm/min. The distribution of temperature in the furnace ranged from 800° to 1,400° C. and increased at a rate of 20° C./cm, and the zone of 1,400 ° C. was 10 cm in length. In combination with He gas, a combination of fluorine-based compound and chlorine-based compound gases as shown in Table 3 was passed through the furnace. The soot preform considerably shrank when it reached the zone of 1,400° C. and was converted into transparent glass at a temperature above 1,500° C. The same results were obtained with an entirely different furnace from the above-heated furnace.

TABLE 3

| Run No. | Fluorine-Based Compound Gas | | Chlorine-Based compound Gas | | Transmission Loss (at 1.30 μm) dB/km | Refractive Index Difference (%) | | Remarks |
|---|---|---|---|---|---|---|---|---|
| | Compound | Flow Rate (ml/min) | Compound | Flow Rate (ml/min) | | Δn (Me) | Δ(F) | |
| Example 3-1 | $SF_6$ | 50 | $Cl_2$ | 50 | 0.5 | 0.30 | −0.10 | |
| Example 3-2 | $SF_6$ | 100 | $Cl_2$ | 100 | 0.6 | 0.20 | −0.15 | |
| Example 3-3 | $SF_6$ | 500 | $Cl_2$ | 100 | 0.8 | 0.20 | −0.55 | |
| Comparative Example 3-1 | $SF_6$ | 500 | — | — | 15 | 0.30 | −0.55 | Impurities of Cu and Fe are contained. |

Δn (Me) and Δn (F) are the same as defined in Table 2.

EXAMPLE 4

Figure 8:
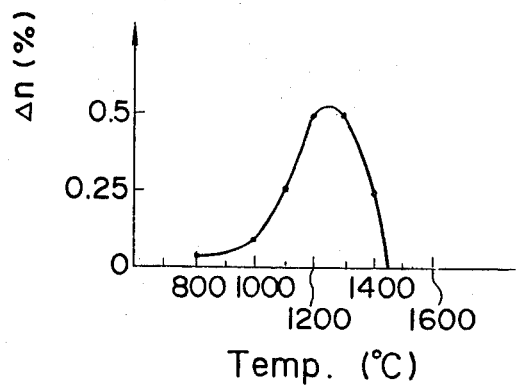
FIG. 8 is a graph showing the relationship between the heat treatment temperature in Example 4 and the refractive index difference ($\Delta n(F)$) of the optical fiber obtained thereby.

Relationship Between Treatment Temperature in Fluorine-Based Compound Gas-Added Atmosphere and Refractive Index Difference Corresponding to Amount of Fluorine Added FIG. 8 is a graph showing the relationship between a treatment temperature and a refractive index difference when the treatment was performed for 3 hours at a given temperature in an inert gas atmosphere containing 1 mol % of chlorine gas and 10 mol % of $SF_6$. It can be seen from the results that incorporation of fluorine into the soot is effective to perform within the range of from 1,100° to 1,400° C.

EXAMPLE 5

Temperature-Increasing Rate and Amount of Fluorine Added to Glass

The refractive index difference (−Δn) was measured at different temperature-increasing rates ranging between 2° and 10° C./min when the treatment was performed under the following conditions:

(A) He gas (flow rate: 15 l/min) containing 1 mol % of $Cl_2$ gas and 5 mol % of $SF_6$;

(B) He gas (flow rate: 15 l/min) containing 5 mol % of $Cl_2$ gas and 5 mol % of $SF_6$; and (C) He gas (flow rate: 15 l/min) containing 1 mol % of $Cl_2$ gas and 20 mol % of $SF_6$.

Figure 9:
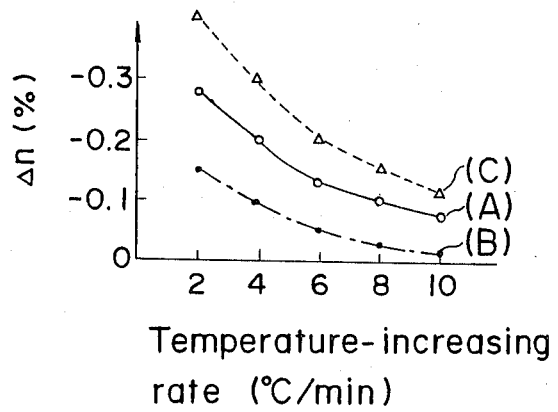
FIG. 9 is a graph showing the relationship between the temperature-increasing rate in Example 5 and the refractive index difference ($\Delta n(F)$) of the optical fiber obtained thereby.

The results are shown in FIG. 9. It can be seen from FIG. 9 that as the temperature-increasing rate is low, a reduction in the refractive index is large; that is, as the temperature-increasing rate is low, the amount of fluorine added to glass is large.

EXAMPLE 6-1

Figures 5A, 5B, 5C:
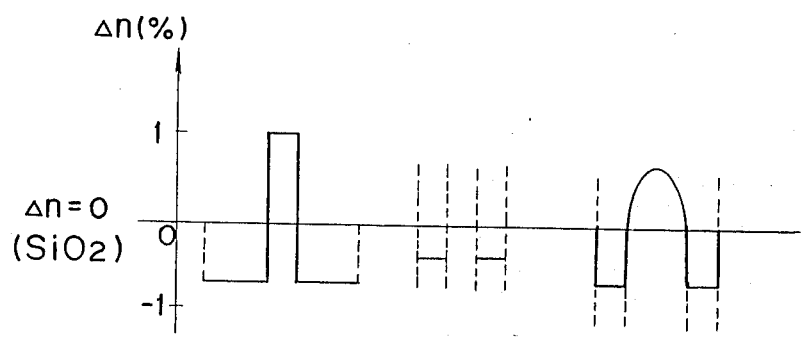
FIGS. 5A to 5C show the refractive index distributions of the glass preforms obtained by applying a heat treatment to the soot deposited members of FIGS. 4A to 4C in Examples 6-1 to 6-3, respectively.

Around a starting member A, a quartz glass rod doped with 17% by weight of $GeO_2$ (diameter: 10 mm), was deposited a soot B of pure $SiO_2$ utilizing the flame hydrolysis reaction, whereupon there was obtained a soot-deposited member of the structure as shown in FIG. 4A. This soot-deposited member was converted into transparent glass by raising the temperature from 800° to 1,400° C. in a He atmosphere containing 1 mol % of $Cl_2$ and 20 mol % of $SF_6$. The thus-produced glass preform had a refractive index distribution as shown in FIG. 5A.

EXAMPLE 6-2

In this example, a carbon rod A about 6 mm in diameter was used as a starting member. A carbon powder layer was formed on the rod by means of an acetylene flame, and then a soot B of pure SiO$_2$ was deposited on the carbon powder layer, thereby obtaining a soot-deposited member of the structure as shown in FIG. 4B. Thereafter, the carbon rod core was removed from the soot-deposited member, which was then converted into transparent glass by raising the temperature from 800° to 1,400° C. in a He atmosphere containing 1 mol % of Cl$_2$ and 10 mol % of SF$_6$. The thus-obtained glass preform had a refractive index distribution as shown in FIG. 5B.

EXAMPLE 6-3

In this example, as a starting member, there was used a quartz glass rod A doped with from 0 to 17% by weight of GeO$_2$ and having a refractive index distribution as shown in FIG. 4C. A soot B of pure SiO$_2$ was deposited on the rod A utilizing the flame hydrolysis reaction. The soot-deposited member was then converted into transparent glass by raising the temperature thereof to 800° to 1,400° C. in a He gas atmosphere containing 1 mol % of Cl$_2$ and 20 mol % of SF$_6$. The thus-obtained glass preform had a refractive index distribution as shown in FIG. 5C.

Characteristics of the Optical Fibers

Optical fibers produced using the glass preforms obtained in Examples 6-1 to 6-3 were free from an increase in absorption due to impurities, and were thus of sufficiently low loss (for example, about 0.5 dB/km at 1.20 micrometer). Furthermore, the absorption peak due to the OH group did not change over time.

The present invention is not limited to the above-described Examples; for example, as the fluorine-based compound gas, CF$_4$, F$_2$, SiF$_4$, COF$_2$, and the like can be used, and as the chlorine-based compound gas, SOCl$_2$, COCl$_2$, CCl$_4$, and the like can be used.

Even if the fluorine addition treatment and the treatment to convert into transparent glass are performed in different furnaces, the amount of fluorine added and the fiber characteristics are the same as in the above Examples.

COMPARATIVE EXAMPLE 6-1

A soot preform was subjected to a heat treatment in a fluorine-based compound gas (e.g., SF$_6$) atmosphere not containing chlorine gas. In this case, etching of the core tube was vigorous as compared with a case where the heat treatment was performed in an atmosphere containing a chlorine gas in combination with the fluorine-based compound gas. Thus, the life of the core tube was shortened. A glass preform obtained by heating in the above-described atmosphere not containing chlorine gas was treated to produce an optical fiber. For this optical fiber, an absorption peak occurred around 1.1 micrometer, which was considered due to the presence of Fe or Cu. When the optical fiber was heated to 100° C. and maintained at this temperature for 2 hours, the absorption loss due to the OH group increased more than 10 times.

It was found that the glass preform was etched. This is believed due to the fact that water in the soot and also in the introduced air reacts with fluorine gas, thereby forming hydrogen fluoride (HF), and this hydrogen fluoride corrodes the glass preform and the quartz glass tube.

On the other hand, when the treatment is performed in an atmosphere containing Cl$_2$ gas in combination, the life of the quartz tube is lengthened. The reason for this is believed to be that the Cl$_2$ gas converts water in the atmosphere into hydrogen chloride (HCl), thereby suppressing the formation of hydrogen fluoride. As is well known, HCl does not etch quartz.

The reason why no impurity is contained in the ultimate optical fiber when the treatment is performed in the chlorine atmosphere is considered that impurities such as Cu and Fe originally contained in the soot preform undergo reactions shown by equations (13) and (14) below when treated in Cl$_2$ gas at temperatures as high as more than 1,100° C. and are converted into volatile gases such as CuCl$_2$ and FeCl$_3$ which can be easily taken out of the system; that is, the impurities are efficiently removed.

$$CuO(s) + Cl_2 \rightarrow CuCl_2 + \tfrac{1}{2}O_2 \tag{13}$$

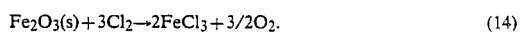

$$Fe_2O_3(s) + 3Cl_2 \rightarrow 2FeCl_3 + 3/2 O_2. \tag{14}$$

On the other hand, in the case of F$_2$ gas, even if CuF$_2$ and FeF$_3$ are formed, they are solid and not volatile.

At the sintering step, if the treatment is performed using the fluorine-based compound gas only, the absorption peak due to the OH group in the resulting optical fiber becomes unstable. The reason is considered that, in the glass after treatment, H atoms are released only insufficiently and exist in a semi-stable form, other than in the Si—OH bond, and the remaining H atoms form the Si—OH bond when heated, as a result of which the absorption peak appears on heating. On the other hand, if the chlorine gas is used in combination with the fluorine-based compound gas, H atoms are released from the glass almost completely, and thus no change in absorption due to the OH group is found in the ultimate optical fiber.

Experiments show that the proportion of the chlorine-based compound gas in the inert gas is preferably up to 2 mol %, and the proportion of the fluorine-based compound gas is preferably up to 50 mol % in that fewer bubbles are formed.

COMPARATIVE EXAMPLE 6-2

In this example, CF$_4$ was used as the fluorine-based compound gas. The flow rate of CF$_4$ was adjusted to 5 mol % based on He gas. The heat treatment was performed by raising the temperature at a rate of 3° C./min up to 800° to 1,400° C. The thus-produced glass preform was converted into an optical fiber. The transmission loss of the optical fiber was large, which was ascribable to irregularities in the structure. One of the causes for these irregularities is considered the admixture of carbon particles. This optical fiber had a step-type refractive index distribution, and its transmission loss was 5 dB/km at 1.30 micrometer.

EXAMPLE 7

The procedure of Comparative Example 6-2 was repeated, with the exception that 7 mol % of O$_2$ gas was added. The transmission loss of the thus-obtained optical fiber was 0.5 dB/km at 1.30 micrometer, which was much lower than that of Comparative Example 2.

As apparent from the results of Example 7 and Comparative Example 6-2, when CF$_4$ (containing a carbon atom) is used, if O$_2$ is added to the gas atmosphere, an increase in transmission loss resulting from the irregularity in structure due to carbon particles can be controlled and there can be obtained an optical fiber of low transmission loss.

As apparent from the above-described Examples and Comparative Examples, the following effects are obtained with the invention.

(1) The heat treatment in an inert gas atmosphere containing fluorine-based compound gas and chlorine-based compound gas in combination according to the present invention provides a large reduction in transmission loss as compared with the heat treatment in an inert gas atmosphere not containing chlorine-based compound gas (Comparative Examples 1 and 2). It is believed that absorption resulting from the presence of impurities is removed by adding $Cl_2$ gas (see Example 1 and Comparative Examples 1 and 2).

(2) In accordance with the present invention, a uniform heating furnace (Example 1) and a zone heating furnace (Example 3) are equal in the effect of incorporation of fluorine.

(3) The suitable temperature range for the heat treatment of the present invention at which fluorine is effectively incorporated has been found to be from 1,100° to 1,400° C. (Example 4).

(4) It is effective for incorporation of fluorine that the temperature-increasing rate in the heat treatment is low. The amount of fluorine added at a rate of 2° C./min is about four times that at a rate of 10° C./min (Example 5).

Thus, in accordance with the method of the present invention, damage of the furnace material is suppressed as compared with the prior art method, the optical fiber produced is free from absorption resulting from impurities such as Cu and Fe, and optical fibers produced from the preform have stable transmission characteristics.

What is claimed is:

1. A method of producing a glass preform for optical fibers comprising the steps of:
    providing a glass particulate soot mass consisting essentially of quartz in the shape of a preform suitable for producing an optical fiber;
    first heating the glass soot particulate mass in a gas atmosphere containing at least a gas of a non-hydrogen containing fluorine-based compound and a gas of cholrine-based compound containing no fluorine to dope said glass particulate mass with fluorine to provide optical fiber preform cladding which has a predetermined lower refractive index than the optical fiber preform core said first heating being effected in a muffle tube made of pure quartz and having iron and copper impurities;
    second heating the fluorine-doped glass particulate mass to produce a transparent glass preform for optical fibers in a muffle tube made of pure quartz; and
    recovering said glass preform;
    wherein in said first heating step (i) said non-hydrogen containing fluorine-based compound is present in an amount sufficient to incorporate fluorine into said glass particulate mass, and (ii) said chlorine-based compound containing no fluorine is present in an amount sufficient to prevent HF formation and to prevent incorporation of an impurity of iron and copper in the glass particulate mass and to thereby suppress light absorption by an impurity of iron and copper in said transparent glass preform wherein, to provide a predetermined desired relative refractive index difference between said cladding and said core by fluorine doping, said glass soot particulate mass is controllably heated during said first heating at a rate of 2° to 10° C./min. until the temperature of said glass soot particulate mass reaches a temperature of 1,100° to 1,400° C.

2. The method as claimed in claim 1, wherein said fluorine-based compound gas is a gas selected from the group consisting of $CF_4$, $F_2$, $SiF_4$, $COF_2$, $SF_6$ and $CCl_2F_2$.

3. The method as claimed in claim 2, wherein said fluorine-based compound gas is $SF_6$.

4. The method as claimed in claim 1, wherein said chlorine-based compound is a gas selected from the group consisting of $Cl_2$, $SOCl_2$, $COCl_2$ and $CCl_4$.

5. The method as claimed in claim 4, wherein said chlorine-based compound gas is $Cl_2$.

6. The method for producing a glass preform of claim 1, wherein said glass soot particulate mass comprises $SiO_2$ produced by a flame hydrolysis reaction.

* * * * *